Patented Feb. 20, 1934

1,947,855

UNITED STATES PATENT OFFICE 1,947,855

DYEING ACETATE SILK

Karl Koeberle and Joachim Mueller, Ludwigshafen-on-the-Rhine, Germany, assignors to General Aniline Works, Inc., New York, N. Y., a corporation of Delaware No Drawing. Application August 11, 1932, Serial No. 628,445, and in Germany August 26, 1931

4 Claims. (Cl. 8—5)

The present invention relates to a process of dyeing acetate silk.

We have found that clear, very fast and powerful dyeings on acetate silk are obtained by employing for dyeing the acetate silk aminoanthrapyrimidines aminated in a nucleus two ring atoms of which are also members of the pyrimidine ring or their substitution products. By the term "aminated" it is meant that the said nucleus is substituted by at least one amino group which may contain alkyl, aryl, aralkyl or cycloalkyl groups. Anthrapyrimidines, the amino compounds of which may be used for dyeing, are the 1.9-, 1.9-4.10- and 1.9-5.10-anthrapyrimidines and their substitution products. The said compounds are used for dyeing acetate silk in the usual manner, as for example in the presence of dispersing agents, in acid, neutral or alkaline baths.

Aminoanthrapyrimidines which contain an amino group in a nucleus which has part in the building up of the pyrimidine ring may be obtained by treating anthraquinones which in one ring contain at least one amino group in the alpha-position and are furthermore amidated in the same ring with amides of mono-carboxylic acids especially formamide or by treating aminoalpha-acylamino-anthraquinones containing the amino and the alpha-acylamino groups in the same ring with ammonia; suitable amidated anthraquinones are for example 1.2-, 1.3- and 1.4-di-amino-anthraquinones and their derivatives. The first-mentioned reaction may be carried out with the addition of organic diluents, as for example phenol and its homologues, and may be accelerated by the addition of catalysts, as for example boric acid or anhydrous oxalic acid. In many cases, for example when the alpha-amino group is only capable of being converted into the pyrimidine ring with difficulty, it may be advantageous to use an excess of the acid amide, for example formamide, itself as a diluent. Instead of the amines, the corresponding mono- or dialkyl or -arylamino-alpha-aminoanthraquinones may be employed. The acylamino-alpha-aminoanthraquinones of the said kind, when treated with formamide, yield the corresponding acyl derivatives of 1.9-anthrapyrimidine from which the acyl groups are split off by saponification, if desired in one operation with the condensation.

If other acid amides than formamide are employed Py-C-substituted anthrapyrimidines are obtained, for example Py-C-methyl compounds in case acetamide is used. Further anthrapyrimidines of the kind in question being substituted in the Py-ring may be obtained by treating the corresponding anthrapyrimidones with agents capable of replacing oxygen or hydroxyl groups by halogen as for example phosphorus pentachloride. In the Py-C-halogenanthrapyrimidines thus obtained the halogen atom can readily be replaced by organic radicles either directly by condensation with amino or hydroxy compounds, or by way of the corresponding diazo compounds which may be obtained from the amines prepared from the halogen compounds by heating them with ammonia. By way of the diazo compounds other substituents, such as mercapto, cyano and like substituents, can readily be introduced into the Py-C-position of the anthrapyrimidines.

The treatment of the amino-alpha-acylaminoanthraquinones in question or their N-alkyl or N-aryl derivatives with ammonia or its salts is preferably carried out in aqueous suspension under pressure, whereby in addition to ring closure in some cases the N-acyl groups not taking part in the ring closure are simultaneously saponified.

The following examples will further illustrate the nature of this invention but the invention is not restricted to these examples. The parts are by weight.

Example 1

30 parts of acetate silk are dyed for ¾ hour at from 65° to 70° C. in a suspension of 0.3 part of 4-amino-1.9-anthrapyrimidine corresponding to the formula

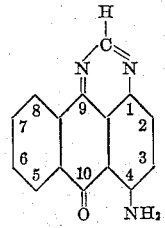

in 1000 parts of water. The silk is then rinsed, washed and dried in the usual manner. The greenish yellow dyeing thus obtainable has a strong green fluorescence and has excellent properties as regards fastness.

Instead of 4-amino-1.9-anthrapyrimidine, 4-methylamino-1.9-anthrapyrimidine corresponding to the formula

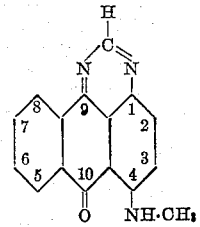

or the reaction product obtainable from 4-amino-1.9-anthrapyrimidine with methyl alcohol in sulphuric acid, or 4-amino-para-methoxy-1.9-anthrapyrimidine, 4-amino-5-nitro-1.9-anthrapyrimidine, 4-amino-beta-methyl-1.9-anthrapyrimidine and the like may be employed for the dyeing.

The dyeing of acetate silk with other dyestuffs of the kind in question may be carried out in a similar manner as described above: 4-amino-Py-C-methyl-1.9-anthrapyrimidine (obtainable by treating 1.4-diamino-anthraquinone with acetamide) gives greenish yellow dyeings with a green fluorescence on acetate silk; 4-amino-Py-C-chloro-1.9-anthrapyrimidine (obtainable by the action of phosphorus pentachloride on 4-benzoyl-amino-1.9-anthrapyrimidone at about 135° C. in nitrobenzene and subsequent saponification of the benzoyl group) gives yellow dyeings on acetate silk; 4-amino-Py-C-methylamino-1.9-anthrapyrimidine (obtainable by acting on 4-amino-Py-C-chloro-1.9-anthrapyrimidine with methylamine) gives salmon-red dyeings on acetate silk; 4-amino-Py-C-phenoxy-1.9-anthrapyrimidine (obtainable by treating 4-amino-Py-C-chloro-1.9-anthrapyrimidine with potassium phenolate) gives yellow dyeings on acetate silk. In the following table some further aminoanthrapyrimidines of the kind in question which may be obtained in a similar manner as described above and which may be employed for dyeing acetate silk as indicated above, are listed. The shades of the resulting dyeings on acetate silk are stated in the table.

| Dyestuff | Shade (acetate silk) |
|---|---|
| 4-amino-2-methyl-1.9-anthrapyrimidine | Yellow. |
| 4-amino-Py-C-amino-1.9-anthrapyrimidine | Yellow. |
| 2-amino-1.9-anthrapyrimidine | Orange. |
| 3-amino-1.9-anthrapyrimidine | Orange |

*Example 2*

100 parts of crude 4-amino-1.9-anthrapyrimidine obtained by heating 1 part of 1.4-diamino-anthraquinone with 2 parts of formamide and 4 parts of phenol to boiling for 1½ hours are dissolved in 400 parts of concentrated sulphuric acid and diluted with such a quantity of water that the total acid concentration amounts to 65 per cent. The mixture is allowed to cool and the precipitated sulphate is filtered off by suction, washed with 65 per cent sulphuric acid until the filtrate has carmine red colour. Then the residue is boiled with dilute ammonia or hot water for a short time whereby the sulphate is converted into the free amino compound. The product is filtered off by suction and dried. The pure 4-amino-1.9-anthrapyrimidine forms small yellow needles, dissolves in concentrated sulphuric acid giving a carmine red colour and has a melting point of 278° to 280° C.

The purification may also be carried out by crystallization or sublimation. The purified product is especially suitable for dyeing acetate silk. The dyeing is effected in the manner described in Example 1.

What we claim is:

1. A process of dyeing acetate silk, which comprises acting on the acetate silk with a bath comprising 4-amino-1.9-anthrapyrimidine.

2. A process of dyeing acetate silk, which comprises acting on the acetate silk with a bath comprising 4-amino-Py-C-methyl-1.9-anthrapyrimidine.

3. A process of dyeing acetate silk, which comprises acting on the acetate silk with a bath comprising 4-amino-Py-C-methylamino-1.9-anthrapyrimidine.

4. A process of dyeing acetate silk, which comprises acting on the acetate silk with a bath comprising a compound of the anthrapyrimidine series which is aminated in a nucleus two ring atoms of which are also members of the pyrimidine ring.

KARL KOEBERLE.
JOACHIM MUELLER.